Patented Dec. 29, 1931

1,839,060

UNITED STATES PATENT OFFICE

ROY G. TELLIER, OF LANSDOWNE, PENNSYLVANIA, ASSIGNOR TO FRED B. JACKSON, OF WARREN, PENNSYLVANIA

SUBSTANCE PREPARATION

No Drawing. Application filed April 21, 1927, Serial No. 185,655. Renewed June 13, 1931.

This invention relates to improvements in substance preparation, and particularly to improvements in the preparation of substances adapted for the decolorization and purification of both oils and aqueous solutions (e. g., raw-sugar solutions). An object of this invention is to provide a method of making a substance of this character, which will be comparatively simple and relatively inexpensive.

In the specification of my pending application, Serial No. 166,014, filed February 4th, 1927, I have described methods of preparing a substance that is mainly a set-gel and the principal constituents of which are clay and organic-char (by which is meant dehydrated organic matter). One of these methods involves the use (as raw materials) of Florida fuller's earth in granular form, waste sulphite liquor and an acid (e. g., sulphuric acid). The waste sulphite liquor is used in a concentrated form of from thirty-one to thirty-two degrees Baumé (or about fifty per cent (50%) total solids). This waste sulphite liquor contains, in solution, organic matter which is molecularly dispersed, and peptizing principle (e. g., tannin). The acid serves to disperse (in the presence of the peptizing principle) to hydrosol state the Florida fuller's earth and to act upon certain substances that are found in the latter, in its natural state, to form pectizing principle (e. g., calcium sulphate, aluminum sulphate). The molecularly dispersed organic matter combines or unites in some way not fully understood (that is, whether it be a chemical union, or a chemical-and-physical union, or only a physical union, is not yet thoroughly established) with the argillaceouos matter that has been dispersed to hydrosol state. The ultimate result of the action of the waste sulphite liquor upon the earth, in the presence of the acid, is the formation of a hydrogel that consists mainly of argillaceous and organic matter; but it contains also pectizing principle which has also a mordant action. This hydrogel is dehydrated; that is, the hydrogel is predried and is then subjected to additional heat-treatment. By this heat treatment, a large portion of the water of the hydrogel is driven off, and the matter of the hydrogel is converted, in great part, into set-gel form; and at the same time, much of the organic matter is charred. The product is finally washed and dried.

The concentration of the waste sulphite liquor used in the process described in the aforementioned application, is effected for reasons of economy; for example, to save freight charges paid on water that would otherwise have to be carried from the paper and pulp plants where the waste sulphite liquor is produced (for example, by the calcium bisulphite process), to the point of utilization of the liquor. However, it has been found that the waste sulphite liquor itself contains sufficient acid principle to effect a dispersion of the Florida fuller's earth to submicroscopic dimensions in the presence of water and the peptizing principle also carried by the liquor, resulting in the conversion of the earth into a hydrosol; so, it is not absolutely essential that an acid be used in conjunction with the waste sulphite liquor, in order to effect this dispersion to hydrosol state. This procedure (doing away with the use of acid in addition to the use of the waste sulphite liquor) enables use to be made of the waste sulphite liquor at the paper and pulp plants in just the condition (which is very dilute) that the liquor runs from the digesters in which it is produced; therefore, economy is effected in the saving of the cost of concentration of the waste sulphite liquor and, further, in the saving of the freight charges paid on the concentrated liquor to the point where it is to be utilized. Another advantage is found to result from the fact that, in a high degree, the waste sulphite liquor, in acting upon the Florida fuller's earth, is freed from those ingredients that are recognized as deleterious in their effects, which have brought about the enactment of laws against the contamination of rivers and streams by the discharge of waste sulphite liquor into them. The result of the reaction between the clay and the weak sulphite liquor is, so far as the latter is concerned, to neutralize it, the acid of the liquor acting upon the earth to effect a dispersion thereof. The effluent liquor is just as susceptible of being concentrated as it was before use and it may be employed for the ordinary purposes to which pulp and paper makers have put the liquor heretofore, such, for example, as a binder in the manufacture of road ballast and surfacing, briquettes of coal, and the like. However, the waste sulphite liquor must be allowed to act longer and in far greater quantity upon the Florida fuller's earth than in the case of the method described in my pending application to which reference has hereinbefore been made and in which acid is used in addition to concentrated waste sulphite liquor. The chemical principle is here taken advantage of that there may be gotten, by prolonging the action of dilute substances or reagents and increasing the quantity of them used, results that are entirely similar in their nature and effect to results obtained by the employment of much stronger substances or reagents used in less quantity and over a shorter period of time. In the present case, the waste sulphite liquor is of little or no value at the plants where it is produced; and it may, in its unconcentrated or dilute form, be used in almost any quantity without adding materially to the cost of production of the decolorizing and purifying material that is the product of this invention. This action of the dilute unconcentrated or crude liquor, when continued for a sufficiently long period of time, accomplishes a result that is entirely similar in its nature to the effect produced by the action of the acid in conjunction with the concentrated waste sulphite liquor, as described in the aforesaid application; that is, there is produced a hydrogel which is principally a union in the nature of a mutual solution of argillaceous material or substance in hydrosol state in or with molecularly dispersed organic matter, and which contains pectizing principle (e. g., calcium sulphate, aluminum sulphate) that serves as a mordant in the use of the finished product. The hydrogel contains much water and requires to be dehydrated; so, it is first pre-dried and is next subjected to additional heat-treatment subsequent to the pre-drying step, in a manner entirely analogous to the procedure set forth in a description of the process disclosed in the aforesaid application. The product will be found efficient in use, even though the step of washing it be omitted; but it is preferable to wash the product and to use, in such washing, water that has been acidulated. If the product be washed, it is then dried before use.

In short, the after-treatment of the hydrogel obtained by practising the present invention is entirely similar to that to which is subjected the argillaceous-and-organic hydrogel obtained by the methods that are described in the hereinabove-mentioned application.

The waste sulphite liquor may be flowed directly from the digester, in a hot condition, upon the Florida fuller's earth; or, it may be used cold, as it comes from, for example, a storage reservoir. As an example of the procedure that may be followed, in carrying out this invention, there may be taken a batch of, say, one hundred pounds (100 lbs.) of granular Florida earth. Upon this earth, there are flowed eight hundred and fifty pounds (850 lbs.) of waste sulphite liquor in its dilute form, or its equivalent; but it is to be well understood that this proportion of waste sulphite liquor to clay is only approximate and the proportion may be varied. By making tests, the state of the effluent may be determined; and when the state of the effluent is the same as that of the influent, the clay has reached a stage wherein it is adapted for further treatment. By this is intended a condition in which a change to hydrogel is indicated.

If the procedure adopted by the manufacturer be such that the percolation of the waste sulphite liquor through the granules is slow, so that the time of contact of the liquor with the clay is relatively prolonged, less liquor will be required, as will be readily understood; but this saving of the liquor is unimportant in the general case, wherein the liquor is of little worth and time is valuable. Again, if the granules of the Florida fuller's earth are relatively large in size, a longer time must be allowed so that the liquor may penetrate into the interior of granules, and there must be an abundance of the liquor provided.

In accordance with the provisions of the patent statutes, I have hereinbefore described the best mode now known to me of carrying this invention into effect; but I desire it to be distinctly understood that I fully realize that changes may be made therein and that I intend to include within the scope of the claims that follow hereinafter all modifications that do not depart substantially from the spirit of the invention set forth therein and thereby.

I claim:

1. Subjecting clay to the action of unconcentrated sulphite liquor until an argillaceous-and-organic hydrogel results from such action.

2. Subjecting clay having the properties possessed by Florida fuller's earth to the action of unconcentrated sulphite liquor until an argillaceous-and-organic hydrogel results from such action.

Signed at Washington, in the District of Columbia, this 21st day of April, 1927.

ROY G. TELLIER.